(12) United States Patent
Richter et al.

(10) Patent No.: US 12,370,422 B2
(45) Date of Patent: Jul. 29, 2025

(54) APPARATUS FOR FIXING GOLF TEES

(71) Applicants: Tino Richter, Berlin (DE); Kai Wendland, Berlin (DE)

(72) Inventors: Tino Richter, Berlin (DE); Kai Wendland, Berlin (DE)

( * ) Notice: Subject to any disclaimer, the term of this patent is extended or adjusted under 35 U.S.C. 154(b) by 0 days.

(21) Appl. No.: 17/794,308

(22) PCT Filed: May 18, 2021

(86) PCT No.: PCT/DE2021/000099
§ 371 (c)(1),
(2) Date: Jul. 21, 2022

(87) PCT Pub. No.: WO2021/233492
PCT Pub. Date: Nov. 25, 2021

(65) Prior Publication Data
US 2023/0302337 A1    Sep. 28, 2023

(30) Foreign Application Priority Data

May 18, 2020 (DE) ...................... 10 2020 003 211.7
May 18, 2020 (DE) ...................... 20 2020 002 355.8

(51) Int. Cl.
*A63B 57/12* (2015.01)
*A63B 57/20* (2015.01)
(Continued)

(52) U.S. Cl.
CPC ............ *A63B 57/12* (2015.10); *A63B 57/203* (2015.10); *G01B 3/1084* (2013.01);
(Continued)

(58) Field of Classification Search
CPC ..... A63B 57/353; A63B 57/50; A63B 57/203; A63B 57/10; A63B 57/12; G01B 3/1084; G01B 2003/1028
See application file for complete search history.

(56) References Cited

U.S. PATENT DOCUMENTS

| | | | | |
|---|---|---|---|---|
| 1,616,059 A | * | 2/1927 | Mulvehill | A63B 57/10 473/394 |
| 2,165,479 A | * | 7/1939 | Hallberg | A63B 57/10 D21/718 |

(Continued)

FOREIGN PATENT DOCUMENTS

| | | |
|---|---|---|
| CN | 203657784 U | 6/2014 |
| DE | 202006013572 U1 | 10/2006 |

(Continued)

OTHER PUBLICATIONS

International Search Report issued on Oct. 20, 2021, in International Application No. PCT/DE2021/000099.

*Primary Examiner* — Steven B Wong
(74) *Attorney, Agent, or Firm* — Wood, Phillips, Katz, Clark & Mortimer

(57) ABSTRACT

An apparatus for fixing golf tees (6) by means of a band (2) which can be rolled up and unrolled and which is arranged together with the rolling and unrolling device in a housing (1) and can be fixed to the at least one golf tee (6), wherein the golf tee (6) has a tee shaft (7) for inserting into the ground and a plateau arranged thereon for a golf ball, wherein the band (2) has openings (3) which are arranged spaced apart in the longitudinal direction (4) of the band, are visible and accessible when the band (2) is unrolled and which penetrate the band (2) and into each of which a tee shaft (7) of golf tees (6) can be frictionally inserted.

18 Claims, 4 Drawing Sheets

(51) Int. Cl.
*G01B 3/1084* (2020.01)
*A63B 57/30* (2015.01)
*A63B 57/50* (2015.01)

(52) U.S. Cl.
CPC ............. *A63B 57/353* (2015.10); *A63B 57/50* (2015.10); *A63B 2210/58* (2013.01); *A63B 2225/74* (2020.08)

(56) References Cited

U.S. PATENT DOCUMENTS

| | | | | |
|---|---|---|---|---|
| 3,347,551 | A * | 10/1967 | Dreyfus | A63B 57/10 473/406 |
| 3,675,929 | A * | 7/1972 | Guarino, Sr. | A63B 57/12 473/396 |
| 3,899,179 | A * | 8/1975 | Vlach | A63B 69/3667 473/218 |
| 4,128,245 | A * | 12/1978 | Vlach | A63B 69/3623 473/218 |
| 4,189,107 | A * | 2/1980 | Quenot | G01B 3/1005 242/390.1 |
| D307,929 | S * | 5/1990 | Parkerson | D21/791 |
| 5,240,254 | A * | 8/1993 | Adlam | A63B 57/10 473/278 |
| 5,768,797 | A * | 6/1998 | Trevino | G01B 3/1005 33/759 |
| 6,095,934 | A * | 8/2000 | Ohama | A63B 57/207 473/406 |
| 6,220,973 | B1 * | 4/2001 | Hsu | A63B 57/203 473/406 |
| 6,514,151 | B2 * | 2/2003 | Delaplane | A63B 69/3629 473/406 |
| 6,826,845 | B2 * | 12/2004 | Pritchard | G01B 3/1084 33/760 |
| D520,096 | S * | 5/2006 | Prestwich | D21/791 |
| 7,676,949 | B1 * | 3/2010 | Lungu | G01B 3/1056 33/758 |
| D640,763 | S * | 6/2011 | Jones | D21/789 |
| D672,001 | S * | 12/2012 | Whitfield | D21/791 |
| 8,789,286 | B1 * | 7/2014 | Vieczorek, Jr. | G01B 3/1003 33/760 |
| D756,477 | S * | 5/2016 | Chorne | D21/791 |
| 2005/0009645 | A1 * | 1/2005 | Isabell | A63B 69/3694 473/400 |
| 2007/0075106 | A1 * | 4/2007 | Meeh | A63B 55/408 224/274 |
| 2009/0318247 | A1 | 12/2009 | Cannata | |
| 2013/0005511 | A1 | 1/2013 | Murphy | |
| 2013/0267350 | A1 | 10/2013 | Koncelik, Jr. et al. | |
| 2018/0117429 | A1 * | 5/2018 | Graziano | A63B 57/353 |
| 2018/0326269 | A1 | 11/2018 | Porter | |
| 2019/0358513 | A1 * | 11/2019 | Walton | A63B 57/10 |
| 2022/0390220 | A1 * | 12/2022 | Tecu | G01B 3/1007 |

FOREIGN PATENT DOCUMENTS

| | | | | |
|---|---|---|---|---|
| DE | 202007005698 U1 | 6/2007 | | |
| GB | 2411123 A | 8/2005 | | |
| GB | 2474639 A | * 4/2011 | | A61B 5/107 |
| KR | 20090101602 A | 9/2009 | | |
| ZA | 9609941 A | * 8/1997 | | G01B 3/1041 |

* cited by examiner

APPARATUS FOR FIXING GOLF TEES

The invention relates to the fixing of supports for a golf ball, in particular a golf tee. Thus, the present invention relates in particular to an apparatus for fixing golf tees.

A 'tee' in golf, also called a 'golf tee', is a small pin made, for example, of wood or plastic or a combination of the two aforementioned materials, which is typically inserted into the ground during teeing and onto which the ball is then allowed to be placed ('teed up'). The ball is thus raised and is usually easier to play. The ball is only allowed to be teed up for the first swing of each hole.

For the sake of completeness and overall understanding: the teeing ground per se, that is the rectangular and mostly raised lawn area at the start of each hole, is usually also referred to as the 'tee'. However, the latter is not directly related to the present invention, which rather relates to the previously described pin-like 'golf tee'.

An exemplary 'standard' tee is 2⅛ inches (about 5.4 cm) in length. The maximum length is usually limited to 4 inches (10.16 cm). Extra-long tees are particularly used for swings with a driver (wood 1). During the cold season, for example, flat winter tees made of plastic are used since standard tees can no longer be inserted into the hard ground.

Such apparatuses are intended to prevent the golf tee from flying off in the event of an unintended hit by a golf club and then a cumbersome search for its retrieval. Typically, beginners of golf, inter alia, will hit golf tees directly during the swing, shooting them far, for example into a bunker, where they are very hard to find. This is inefficient, a waste of material and environmentally unfriendly, for example due to the increased plastic waste.

The prior art provides a number of possible solutions for such apparatuses:

DE 20 200 7 005 698 U1 proposes a leather tape, a textile tape, a plastic tape, etc. for this purpose, which is connected at one end via a loop fastening to the golf tee and at the other end is provided with a fastening anchor which is pressed into the ground.

It is understood that there is a stable fixation, but also that it can be detached from the ground, with the effect of greater energy dissipation and thus a short flight path.

DE 20 2006 013 572 U1 discloses connecting a plurality of golf tees to one another and to a ground anchor. The ground anchor is simultaneously the receiver for the spout, i.e., it is a split golf tee and not a one-piece golf tee.

US 2018/0 326 269 A1 provides the arrangement of a plurality of golf tees connected by a common tether.

The tether can be fastened via holes in the golf tees, or the tether is fixed by means of a barrel which is slid over the tee shaft in order to achieve clamping between the barrel and the tee shaft by capturing the tether.

Finally, reference should be made to US 2013/0 005 511 A1, which describes a rewindable golf tee. The golf tee is connected via a link to a rewinding device which is wound and unwound.

At least the rewinding process takes place in a damped manner. The link and the golf tee are connected via a bore or eyelet in the golf tee.

The rewinding device may be further equipped with the following elements: a pitch mark repairer, a ball marker, a groove cleaner, a replacement T-piece, a pencil or a score keeper.

The considerable disadvantage of the mentioned apparatuses is that special golf tees are provided, specifically provided with bores, eyelets or also clamping barrels. Furthermore, the number of golf tees and their spacing from one another is predetermined or the spacing can only be varied within limits by untying or retying the tether to the eyelet, for example. In addition, different tee shafts cannot be handled. This is not very user friendly.

An object of the invention is now described below. An object of the invention is to fix any number of golf tees with different, virtually freely selectable spacings and any shaft diameters. This object is achieved with the features of Claim 1. Advantageous embodiments are the subject matter of the dependent claims.

It is a further object of the invention to convert the impact force of the golf swing to the tee into a rotational movement of the tee fixation and thus also of the tee tape via the apparatus according to the invention for golf tee fixation, such that the force application to the tee is rapidly attenuated and it can be better retained in the tee holder in order to fix it flat in the holder and not to hit it away.

The apparatus according to the invention for fixing golf tees by means of a tape which can be wound and unwound and which, together with the winding and unwinding device, is arranged in a housing and to which at least one golf tee can be fastened, wherein the golf tee has a tee shaft for insertion into the ground and a plateau, arranged thereon, for a golf ball, the tape has openings arranged spaced apart in the tape longitudinal direction, which openings are visible and accessible when the tape is unwound, which penetrate the tape and into each of which a tee shaft of a golf tee can be frictionally inserted.

In one embodiment, the tape comprises one or more aforementioned openings, preferably at least two, even more preferably at least three openings, in the tape longitudinal direction. In the case of a plurality of openings, they may be the same size in diameter or have a different diameter per opening. In the case of a plurality of openings, they may all be equally spaced apart or be differently spaced apart from one another.

The openings can therefore have different spacings or equal spacings or a combination of equal and unequal spacings and penetrate the tape preferably on the broad tape surface.

Furthermore, the internal dimensions of the openings can be equal or unequal or a combination of equal and unequal dimensions.

This configuration of the apparatus allows any number of golf tees to be connected to one another. The user can choose the optimum spacing between the golf tees for said user, and the golf tees are fixed by the applied frictional connection between the edge of the openings and the tee shaft in such a way that they do not detach from the tape when they are inadvertently struck by a golf club.

To achieve the frictional connection between the tee shaft and the inner edge of the opening, the following solutions are preferred:

The inner edge of the openings is serrated, preferably in a star-like manner. When the openings are penetrated, the serrations bend outwards in the insertion direction, clamp the tee shaft and prevent withdrawal up to a certain level of force, since this withdrawal movement means a change in the direction of bending of the serrations. A further advantage of this embodiment is that tee shafts with different diameters can be used in the case of identical opening sizes. The differences in diameter are compensated by the degree of bending of the serrations. Production is also simple. The openings with the serrations can be introduced by punching.

In another solution, the openings are slit-like or oval. When the tee shafts are inserted, this leads to deformations in the edges of the openings and thus to clamping forces between the deformations in the edges of the openings and the respective tee shafts. Tee shafts with different diameters can also be used in this case. The technological manufacturability is also simple.

In a third solution variant, the inner edges of the openings are surrounded by a highly elastic material which expands primarily in the plane of the tape when the tee shafts are inserted and thus clamps the respective tee shafts. Tee shafts with different diameters can be used.

These variants also function in tee shafts which do not have a circular cross-section. In all cases, the remaining size of the free cross-sectional area of the openings is smaller than the cross-sectional area of the golf tees to be inserted.

According to a further embodiment of the apparatus, the tape has a tongue at its end, which tongue projects out of the housing in the wound state of the tape. This tongue is used to pull out (unwind) the tape by hand.

At least one opening into which a tee shaft of a golf tee can be inserted is advantageously also arranged in this tongue. The opening preferably extends transverse or perpendicular to the tape longitudinal direction. This has several advantages. Firstly, a golf tee is provided with which the end of the tape can be fixed on the ground. Secondly, it is easier to grasp a golf tee than a tongue by hand when unwinding the tape.

According to a further embodiment of the apparatus, the tape has, at its end, in addition to/or as an alternative to a tongue, an end piece which likewise projects out of the housing in the wound state of the tape. This end piece, optionally with or without an additional tongue, is used, on the one hand, to pull out (unwind) the tape by hand, but additionally itself comprises at least one tee opening, preferably two, even more preferably three tee openings. That is to say, in the context of the invention, the aforesaid end piece can have one or more, preferably two, more preferably three, openings/holes as a tee holder. In this case, the openings themselves can all be configured to be identical or different. For example, two openings/holes can be smaller in diameter than a third opening and additionally be provided on the top and/or bottom with a protuberance, and thus receive different tees to those of the third opening. It is thus conceivable that said openings/holes with smaller diameters and protuberances on the top and bottom can receive conventional, narrow golf tees in a frictional and/or interlocking manner, whereas a third simple opening/hole without protuberances, but with a larger diameter, is designed so as to suitably receive and fix a conical golf tee. It is immediately clear to a person skilled in the art that there can also be a wide variety of technical embodiments of said openings/holes on the end piece in order to correspondingly adapt them to the preferred golf tees to be used, and in order to bring about a frictional and/or interlocking connection and thus a suitable fixing of the golf tee in the tee holder according to the invention. Thus, said openings/holes for the tee fixing can also have different, suitable wall thicknesses and/or elevations and/or materials.

The specified end piece can be made of an appropriately suitable material. For example, a flexible or semi-flexible material is suitable as long as the insertion and fixing of a golf tee by means of frictional and/or interlocking connection is made possible. A suitable material for the end piece is a silicone and/or a rubber material.

In one embodiment, the tee tape itself is a flexible or semi-flexible tape.

In the context of the invention, for example, the embodiments comprising a flexible tape and a flexible end piece are particularly well suited for converting the force application to a golf tee, when it is inadvertently struck, into a rotational movement of the end piece and of the flexible tape, whereby energy of the force application is dissipated and the golf tee is held in a fixed manner in its opening/hole. This means that the arrangement of the tape and end piece as well as the use of a flexible or semi-flexible material for them, such as silicone and/or rubber, enable particularly preferred fixing of the golf tee in the tee tape apparatus according to the invention.

In a further embodiment, the tee tape according to the invention comprises a holder which allows the tee tape to be fastened, for example, to the clothing of a user via a suitable cord, via a suitable band, for example rubber band, or by means of another suitable connecting means. For example, the tee tape can also be clipped by means of a clip via said holder.

In a further embodiment, the tee tape comprises an apparatus, such as a button, which allows the flexible tee tape to be retracted.

In order to stock a certain number of golf tees for insertion into the openings of the tape, according to a further embodiment, the housing has at least one, preferably a plurality of receptacles on the outside for the shafts of golf tees.

The tape itself preferably consists of an elastic material and/or of woven and elastically coated material. Further advantageous embodiments are directed to providing the apparatus with expedient additions for golf.

Therefore, according to the invention, the tape which can be wound and unwound is a tape measure with an inch and/or metric scale. This also makes it easier to individually determine the spacings between the golf tees.

Furthermore, the housing has a connecting element for detachably fastening it to a piece of clothing or another object.

The housing also allows an advertising space to be provided. It may also be provided with a circular spirit level to align the tees in two dimensions.

In a known manner, the housing can have a pitch mark repairer and/or a ball marker and/or a grove cleaner.

Furthermore, the housing can be provided with an LED that can be switched on and off.

The pitch mark repairer can additionally be used to fix the housing to the ground.

According to a further advantageous embodiment, the winding device can be driven by an electric motor in the housing. This has the advantage that the tape is not continuously accelerated when wound, as is the case, for example, with spring-driven winding devices, for which reason they are also provided with a damper.

In order to have the necessary energy for electrically operated components, according to a further embodiment the forces and movements occurring during the winding and unwinding of the tape can be used by means of an energy converter to charge an energy store in the housing.

The invention is explained with reference to the drawings. In the drawings.

Figure 3:
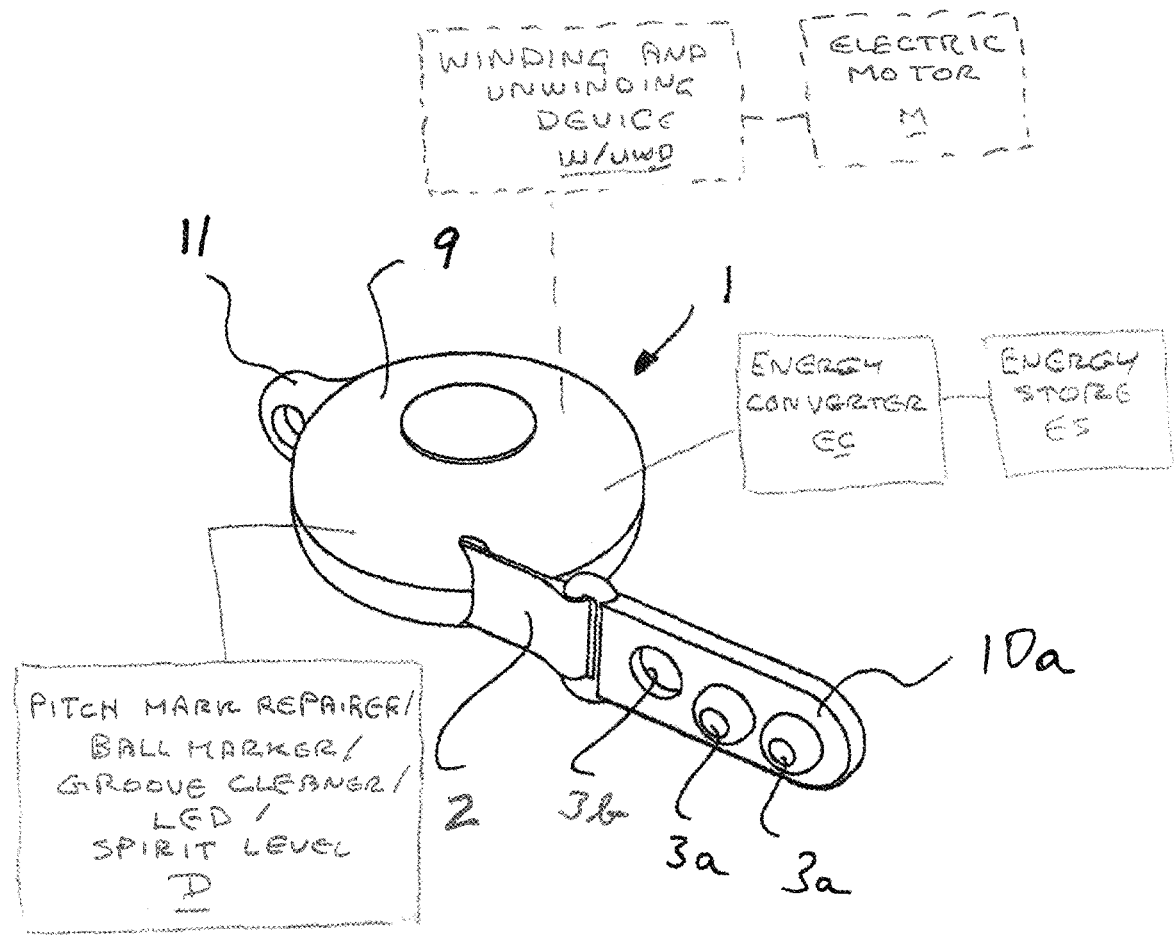

FIG. 3 shows an embodiment of the tee tape according to the invention in a slightly laterally oblique view from the underside with the tee tape slightly pulled out and an end piece for 3 exemplary tees, wherein the first two tee holders are configured with protuberances and with a smaller diameter than the last, third tee holder, which is designed as a mere hole/opening with a larger diameter. Furthermore, FIG. 3 shows a holding apparatus for fastening the tee tape, for example, to the clothing of a user.

Figure 4:
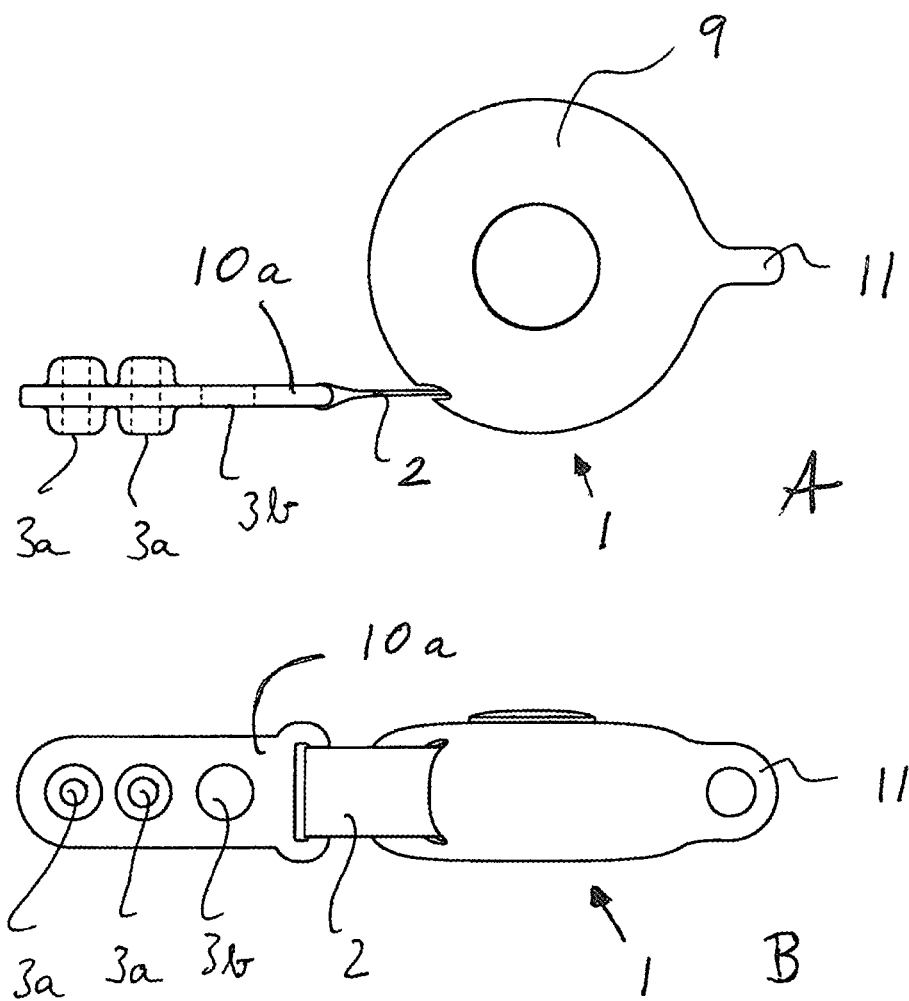

FIG. 4 in the upper illustration A, however, shows the tee tape according to FIG. 3 in a side view with the tee tape slightly pulled out and the end piece according to FIG. 3; and, in the lower illustration B, shows the tee tape according to FIGS. 3 and 4A, however, in a view from below.

Figure 1:
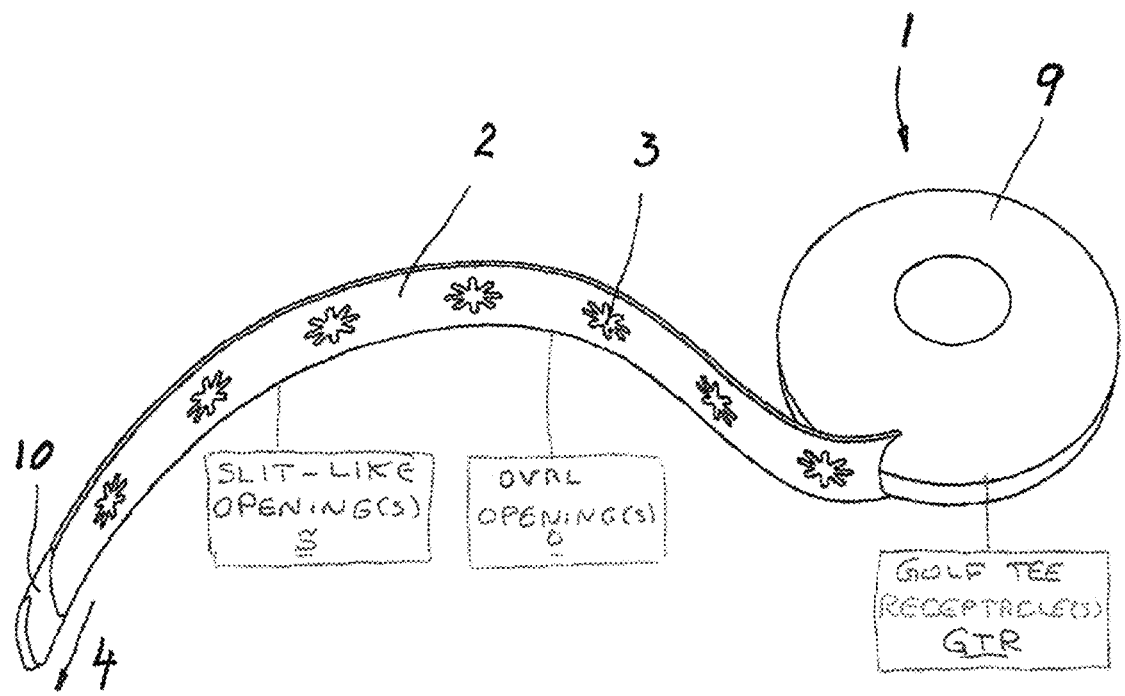
FIG. 1 shows the tee tape with a housing.

FIG. 1 shows the apparatus for fixing golf tees 6 by means of a tape 2 which can be wound and unwound and which, together with the winding and unwinding device, identified schematically at W/UWD in FIG. 3, is arranged in a housing 1. The winding and unwinding device W/UWD may be operated by an electric motor, shown schematically at M in FIG. 3. An energy converter EC, as described above, is shown schematically in FIG. 3 and is configured to charge the energy store ES, as shown schematically in FIG. 3. The tape 2 is unwound here so that the openings 3 can be seen and used for fixing the golf tees 6. The housing 1 can additionally be fixed in the ground by a pitch mark repairer arranged on the housing 1.

The golf tees 6 have a tee shaft 7 for insertion into the soil and a plateau arranged thereon for a golf ball.

Prior to the insertion of the golf tees 6 into the ground, the tee shafts 7 are each inserted through an opening 3 of the tape 2 to produce a frictional connection.

The openings 3 are arranged in a spaced manner in the tape longitudinal direction 4. In this case, the openings 3 have different spacings or equal spacings or a combination of equal and unequal spacings.

In each of these arrangements of the openings 3, the user can set the spacing and the number of golf tees 6 in a way that is most optimal for the user's style of play.

In order to be able to use golf tees 6 with different cross-sectional areas and cross-sectional sizes, while retaining the frictional connection between the tape 2 and the golf tees 6, the inner edge of openings 3 is designed to be serrated, preferably star-like, or the openings 3 are designed to be slit-like S or oval O, as shown schematically in FIG. 1, or the inner edge of the openings 3 is provided with a highly elastic material. In all cases, the remaining size of the free cross-sectional area of the openings 3 is smaller than the cross-sectional area of the golf tee 6 to be inserted.

The tape 2 itself consists of an elastic material and/or of woven and elastically coated material which can be wound well. In this case, the winding device in the housing 1 is driven by an electric motor in order to ensure smooth winding. Of course, spring-loaded winding apparatuses are also possible.

So that the tape 2 can be grasped by hand for unwinding, its end has a tongue 10 which, in the wound state, projects out of the housing 1. This tongue 10 can also be equipped with one or more openings 3 for receiving a tee shaft 7.

The housing 1 has a connecting element, for example a snap hook, or just a lateral opening for detachably fastening it to a piece of clothing, a key fob or another object.

An advertising space 9 arranged on the housing 1 can be used, for example, to indicate the manufacturer or a special tournament.

The housing 1 may also have a receptacle, shown schematically at GTR in FIG. 1, into which a shaft of a golf tee can be directed.

The housing 1 may further be provided with a pitch mark repairer and/or a ball marker and/or a groove cleaner and/or an LED that can be switched on and off and/or a circular spirit level as collectively schematically identified at D in FIG. 3.

Figure 2:
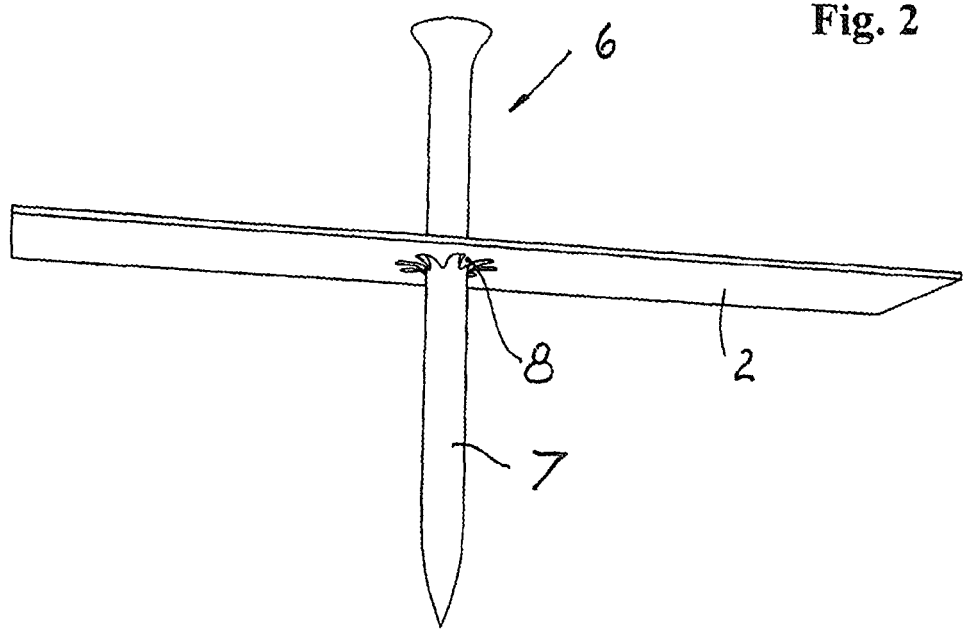
FIG. 2 shows the fastening of a tee shaft in an opening of the tape with a serrated edge.
Figure 2:
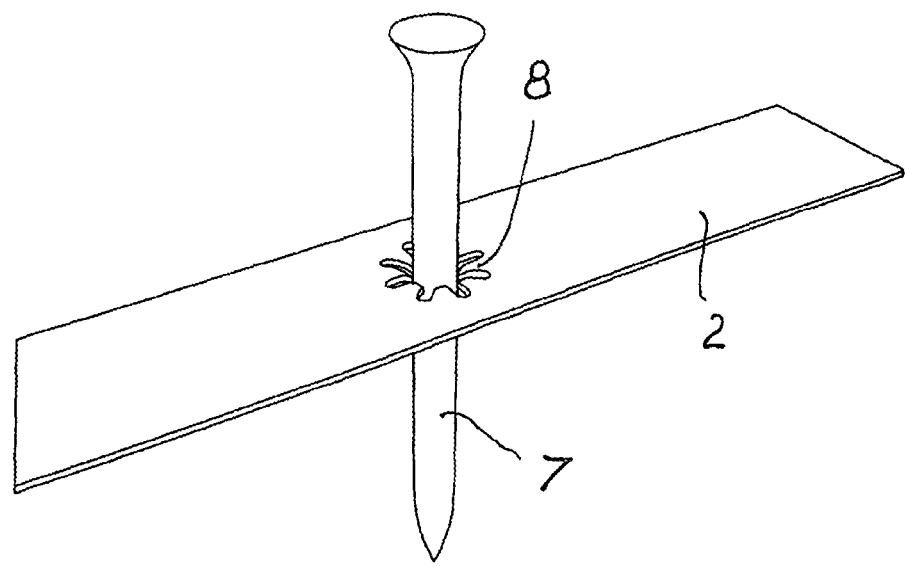
Figure 2:
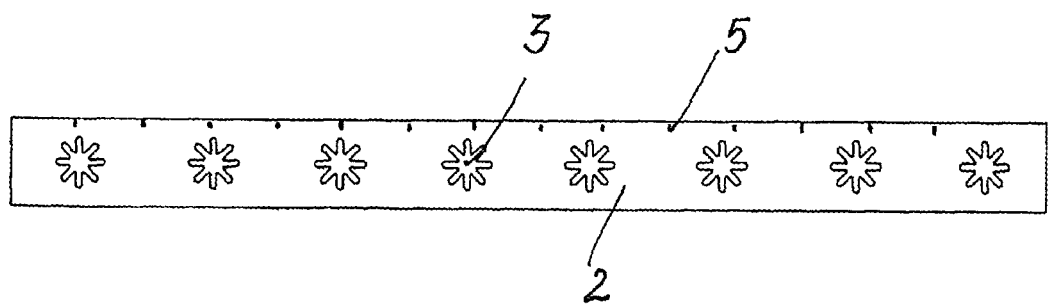

FIG. 2 shows the fastening of a tee shaft 7 in an opening 3 of the tape 2, the opening 3 having an inner edge with serrations 8, preferably arranged in a star-like manner, in plan view, and the inserted tee shaft 7 being shown in two side views.

When the opening 3 is penetrated, the serrations 8 are bent outwards in the insertion direction, clamping the tee shaft 7 and preventing withdrawal up to a certain level of force. Since the withdrawal movement means a change in direction of bending of the serrations 8, the clamping forces increase when the tee shaft 7 is pulled out of the opening 3.

Furthermore, it is shown that the tape 2 which can be wound and unwound is a tape measure with an inch and/or metric scale 5. This can be used by the user in an assisting manner for selecting the spacings between openings 3.

A further advantage of this embodiment is that tee shafts 7 with different cross-sectional areas can be used in the case of identical opening sizes. The differences in the dimensions or shape are compensated by the degree of bending of the serrations 12.

FIG. 3 shows a particular embodiment of a tee tape according to FIGS. 1 and 2. Unless specified otherwise here, the same reference signs also have the same meanings as mentioned above for FIGS. 1 and 2. Therefore, only the special features are to be discussed below: The end piece 10*a* on the slightly unwound measuring tape 2, in FIG. 3, itself comprises three exemplary tee holders 3*a* and 3*b*. In this case, the first two tee holders 3*a* are provided with protuberances on the top and bottom (only underside shown here), into which a tee can be fixed with a frictional connection. The two openings 3*a* can either be of the same design with the protuberances or different, for example with different diameters or different dimensions of the protuberances. FIG. 3 further shows a special holding apparatus 11 by means of which the tee tape can be connected, for example, to a piece of clothing of a user by way of a type of band, cord, rubber band and/or a retractable and extendable apparatus.

FIG. 4 shows a particular embodiment of a tee tape according to FIGS. 1, 2 and 3; and this in side view (A) and in bottom view (B).

Unless specified otherwise here, the same reference signs also have the same meanings as mentioned above for FIGS. 1, 2 and 3. Therefore, only the special features are to be discussed below: The end piece 10*a* on the slightly unwound measuring tape 2, in FIGS. 4A and B, itself comprises three exemplary tee holders 3*a* and 3*b*. In this case, the first two tee holders 3*a* are provided with protuberances on the top and bottom, into which a tee can be fixed with a frictional connection. The two openings 3*a* can either be of the same design with the protuberances or different, for example with different diameters or different dimensions of the protuberances. FIG. 4 further shows a special holding apparatus 11 by means of which the tee tape can be connected, for example, to a piece of clothing of a user by way of a type of band, cord, rubber band and/or a retractable and extendable apparatus.

In the context of the above disclosure, the present invention further comprises the embodiments numbered below:
  1. The invention relates to an apparatus for fixing golf tees (6) by means of a tape (2) that can be wound and unwound, preferably a flexible tape, which is arranged together with the winding and unwinding device in a housing (1) and to which at least one golf tee (6) can be fastened, wherein the golf tee (6) has a tee shaft (7) for insertion into the ground and a plateau, arranged thereon, for a golf ball, characterized in that the tape (2) has openings (3) which are arranged spaced apart in the tape longitudinal direction (4), which are visible and accessible when the tape (2) is unwound and which penetrate the tape (2) and into each of which a tee shaft (7) of golf tees (6) can be inserted in a frictional and/or interlocking manner.

In a preferred embodiment, the tape described therein is a flexible or semi-flexible tape.

2. The apparatus according to Embodiment 1, characterized in that the tape (2) which can be wound and unwound is a tape measure with an inch and/or metric scale (5).

3. The apparatus according to Embodiment 1 or 2, characterized in that the tape (2) consists of an elastic material and/or of woven and elastically coated material.

For example, the aforementioned elastic material allows a flexible tape to be provided.

4. The apparatus according to any one of Embodiments 1 to 3, characterized in that the inner edge of the openings (3) is designed to be serrated, preferably star-like.

Within the context of the invention, the openings or holes can have different diameters, wall thicknesses and shapes, such as comprise a protuberance, for example.

5. The apparatus according to any one of Embodiments 1 to 4, characterized in that openings (3) are designed to be slit-like or oval.

6. The apparatus according to any one of Embodiments 1 to 5, characterized in that the inner edge of the openings (3) is surrounded by a highly elastic material which, while retaining the frictional connection, is able to receive tee shafts (7) of different cross-section.

7. The apparatus according to any one of Embodiments 1 to 6, characterized in that the openings (3) have different spacings or equal spacings or a combination of equal and unequal spacings.

8. The apparatus according to any one of Embodiments 1 to 7, characterized in that the internal dimensions of the openings (3) are equal or unequal or are designed as a combination of equal and unequal dimensions.

9. The apparatus according to any one of Embodiments 1 to 8, characterized in that in the wound state, a tongue (10) of the tape (2) projects out of the housing (1), which tongue is used to withdraw the tape (2) from the housing (1) by hand, and at least one opening (3) for receiving the shaft (7) of a golf tee (6) is likewise arranged in said tongue (10).

In one embodiment, the apparatus according to the invention can have an end piece as described above instead of said tongue.

10. The apparatus according to one of Embodiments 1 to 9, characterized in that the housing (1) has at least one receptacle for the shaft (7) of a golf tee (6).

11. The apparatus according to any one of Embodiments 1 to 10, characterized in that the housing (1) has a connecting element or a lateral opening in order to detachably fasten it to a piece of clothing, a key fob or another object.

12. The apparatus according to any one of Embodiments 1 to 11, characterized in that an advertising space (9) is arranged on the housing (1).

13. The apparatus according to any one of Embodiments 1 to 12, characterized in that the housing (1) has a pitch mark repairer and/or a ball marker and/or a groove cleaner and/or an LED that can be switched on and off and/or a circular spirit level.

14. The apparatus according to any one of Embodiments 1 to 13, characterized in that the winding device in the housing (1) can be driven by an electric motor.

15. The apparatus according to any one of Embodiments 1 to 14, characterized in that the forces and movements occurring when the tape (2) is wound and unwound can be used to charge an energy store of the housing (1) by means of an energy converter.

16. The apparatus according to any one of Embodiments 1 to 15, characterized in that the tape is a flexible or semi-flexible tape, which terminally comprises a flexible or semi-flexible end piece comprising at least one opening/hole for a golf tee, such that, in the event of a golf swing against the golf tee, the corresponding force application to the fixed golf tee is converted into a rotational movement of the end piece and thus also of the flexible or semi-flexible tape.

LIST OF REFERENCE NUMERALS

1 Housing
2 Tape
3 Openings
4 Tape longitudinal direction
5 Scale
6 Golf tee
7 Tee shaft
8 Serrations
9 Advertising space
10 Tongue
10a End piece

The invention claimed is:

1. In combination: a) an apparatus for fixing golf tees by means of a tape that can be wound and unwound, which tape is arranged together with a winding and unwinding device in a housing; and b) at least one golf tee, wherein each of the at least one golf tee has a tee shaft for insertion into the ground and a plateau, arranged thereon, for a golf ball, wherein the tape has a plurality of openings which are arranged spaced apart in the tape longitudinal direction, each of the tape openings visible and accessible when the tape is unwound and penetrating the tape, the tee shaft of a first of the at least one golf tee inserted in one of the tape openings, the one tape opening configured so that the shaft on the first of the at least one golf tee that is inserted is frictionally engaged with the tape to thereby fasten the first of the at least one golf tee to the tape, wherein the housing has a pitch mark repairer and/or a ball marker and/or a groove cleaner and/or an LED that can be switched on and off and/or a circular spirit level.

2. The combination according to claim 1, wherein the tape is a tape measure with an inch and/or metric scale.

3. The combination according to claim 1, wherein the tape consists of an elastic material and/or of woven and elastically coated material.

4. The combination according to claim 1, wherein an inner edge of the tape openings is serrated.

5. The combination according to claim 1, wherein the tape openings are slit-like or oval.

6. The combination according to claim 1, wherein an inner edge of the tape openings is surrounded by a highly elastic material which, while retaining the frictional connection, is able to receive tee shafts of different cross-section.

7. The combination according to claim 1, wherein the tape openings have different spacings or equal spacings or a combination of equal and unequal spacings.

8. The combination according to claim 1, wherein internal dimensions of the tape openings are equal or unequal or are designed as a combination of equal and unequal dimensions.

9. The apparatus according to claim 1, wherein in a wound state, a tongue of the tape projects out of the housing, which tongue is used to withdraw the tape from the housing by hand, and at least one opening for receiving the shaft of a golf tee is likewise arranged in said tongue.

10. The combination according to claim 1, wherein the housing has at least one receptacle for the shaft of a golf tee.

11. The combination according to claim 1, wherein the housing has a connecting element or a lateral opening in order to detachably fasten it to a piece of clothing, a key fob or another object.

12. The combination according to claim 1, wherein an advertising space is arranged on the housing.

13. The combination according to claim 1, further in combination with an electric motor in the housing for driving the winding and unwinding device.

14. The combination according to claim 1, wherein forces and movements occurring when the tape is wound and unwound can be used to charge an energy store of the housing by means of an energy converter.

15. The combination according to claim 1, wherein an inner edge of the openings is serrated star-like.

16. The combination according to claim 1, wherein a second of the at least one golf tee is inserted in another of the tape openings in a same manner that the first of the at least one golf tee is inserted into the one tape opening.

17. In combination: a) an apparatus for fixing golf tees by means of a tape that can be wound and unwound, which tape is arranged together with a winding and unwinding device in a housing; and b) at least one golf tee, wherein each of the at least one golf tee has a tee shaft for insertion into the ground and a plateau, arranged thereon, for a golf ball, wherein the tape has a plurality of openings which are arranged spaced apart in the tape longitudinal direction, each of the tape openings visible and accessible when the tape is unwound and penetrating the tape, the tee shaft of a first of the at least one golf tee inserted in one of the tape openings, the one tape opening configured so that the shaft on the first of the at least one golf tee that is inserted is frictionally engaged with the tape to thereby fasten the first of the at least one golf tee to the tape, further in combination with an electric motor in the housing for driving the winding and unwinding device.

18. In combination: a) an apparatus for fixing golf tees by means of a tape that can be wound and unwound, which tape is arranged together with a winding and unwinding device in a housing; and b) at least one golf tee, wherein each of the at least one golf tee has a tee shaft for insertion into the ground and a plateau, arranged thereon, for a golf ball, wherein the tape has a plurality of openings which are arranged spaced apart in the tape longitudinal direction, each of the tape openings visible and accessible when the tape is unwound and penetrating the tape, the tee shaft of a first of the at least one golf tee inserted in one of the tape openings, the one tape opening configured so that the shaft on the first of the at least one golf tee that is inserted is frictionally engaged with the tape to thereby fasten the first of the at least one golf tee to the tape, wherein forces and movements occurring when the tape is wound and unwound can be used to charge an energy store of the housing by means of an energy converter.

\* \* \* \* \*